United States Patent [19]

Scherrer

[11] Patent Number: 4,711,060
[45] Date of Patent: Dec. 8, 1987

[54] FALSE CEILING OR FALSE WALL CONSTITUTED BY A STRETCHED SHEET FASTENED

[76] Inventor: Fernand Scherrer, 2, rue Georges Bizet, 68170 Rixheim, France

[21] Appl. No.: 905,781

[22] Filed: Sep. 9, 1986

[30] Foreign Application Priority Data

Sep. 13, 1985 [FR] France .................... 85 13620

[51] Int. Cl.$^4$ ............................. E04B 1/00
[52] U.S. Cl. ....................... 52/222; 52/220; 52/273
[58] Field of Search ............ 52/222, 63, 220, 221, 52/273; 135/119, 120; 160/237, 254, 180

[56] References Cited

U.S. PATENT DOCUMENTS

| 300,776 | 6/1884 | Henry | 160/237 |
|---|---|---|---|
| 1,744,177 | 1/1930 | Schaler | 160/354 |
| 1,744,496 | 1/1930 | Partenico | 160/354 |
| 3,018,784 | 1/1962 | Baxman | 135/119 |
| 3,564,784 | 2/1971 | Mollinger | 52/222 |
| 4,031,942 | 6/1977 | Shelton | 160/180 |
| 4,084,358 | 4/1978 | Winters | 52/222 |
| 4,408,433 | 10/1983 | Scherrer | 52/222 |

FOREIGN PATENT DOCUMENTS

| 2225892 | 6/1973 | Fed. Rep. of Germany | 52/220 |
|---|---|---|---|
| 1284768 | 8/1972 | United Kingdom | 47/32 |
| 1360975 | 7/1974 | United Kingdom | 52/222 |

Primary Examiner—Henry E. Raduazo
Attorney, Agent, or Firm—McAulay, Fields, Fisher, Goldstein & Nissen

[57] ABSTRACT

A false ceiling or false wall is constituted by a stretched sheet fastened, along its edges, to a support fixed to the wall or to the ceiling. The sheet bears, at the passage of an element projecting with respect to the wall, such as a pipe, a reinforcing plate glued on its face turned towards the celing or wall, this reinforcing plate presenting a cut-out allowing passage of the projecting element through it and through the sheet.

12 Claims, 4 Drawing Figures

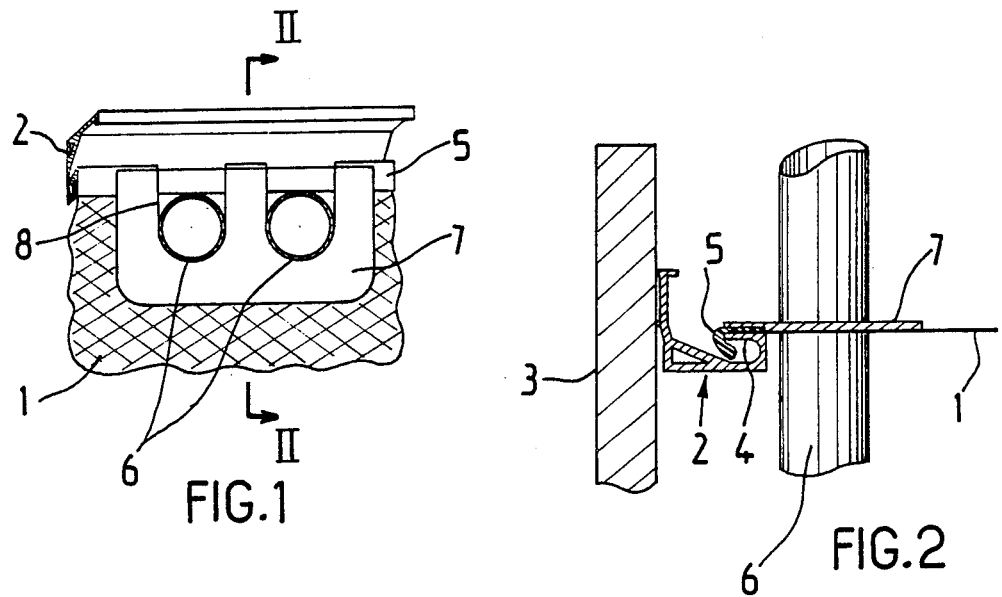
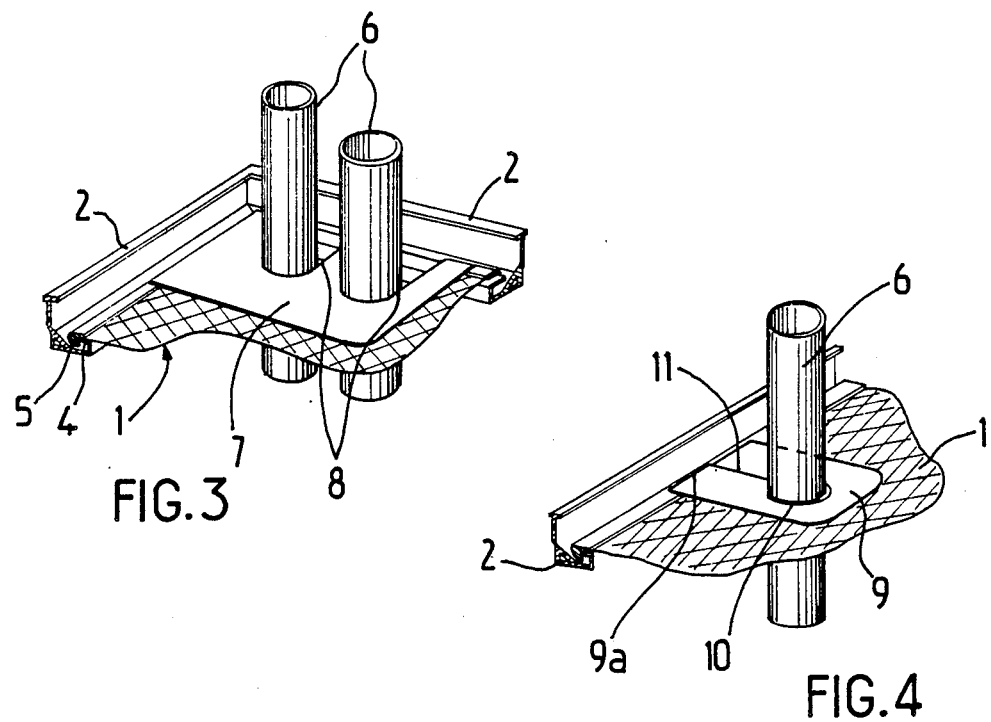

FALSE CEILING OR FALSE WALL CONSTITUTED BY A STRETCHED SHEET FASTENED

BACKGROUND OF THE INVENTION

The present invention relate to a false ceiling or false wall constituted by a stretched sheet fastened, along its edges, to a support fixed to the wall or ceiling.

False ceilings are already known which comprise, on the one hand, a horizontal frame fixed to the upper part of the walls of a premises, this frame being formed by an outer longitudinal member itself constituted by butt-jointed sections and, on the other hand, a sheet stretched horizontally within this frame, this sheet being constituted by a sheet of plastics material or a fabric cloth. The sheet is maintained stretched due to the fastening, on the longitudinal member, of an edge integral with the sheet, forming to some extent a "harpoon", this edge presenting in cross section the form of a hook hooking on a shoulder of the longitudinal member.

Although such a false ceiling has proved relatively easy to position it has, however, raised certain problems at those points where, in a room where the false ceiling is positioned, there are water downpipes, central heating pipes, electric sleeves, etc..., such elements being placed against the wall or some centimeters therefrom. Various techniques have been envisaged to allow the sheet to go round these elements projecting with respect to the wall, but such techniques have not provded satisfactory as they generally render the process of assembly of the sheet complicated.

SUMMARY OF THE INVENTION

It is an object of the present invention to overcome these drawbacks by providing a false ceiling or false wall of particularly simple design, allowing easy passage of the projecting elements such as various pipes.

To that end, this false ceiling or false wall, constituted by a stretched sheet fastened, along its edges, to a support fixed to the wall or to the ceiling, is characterized in that the sheet bears, at the passage of an element projecting with respect to the wall, such as a pipe, a reinforcing or wall, this reinforcing plate presenting a cut-out allowing passage of the projecting element through it and through the sheet.

BRIEF DESCRIPTION OF THE DRAWINGS

The invention will be more readily understood on reading the following description with reference to the accompanying drawings in which:

FIG. 1 is a view in perspective, from above, of a stretched sheet fastened on a longitudinal element, at the point where two vertical pipes pass.

FIG. 2 is a view in vertical section made along line II—II of FIG. 1.

FIG. 3 is a view in perspective illustrating the use of a reinforcing plate for the passage of pipes located in a corner of a room.

FIG. 4 is a view in perspective of a variant embodiment of the invention.

DESCRIPTION OF THE PREFERRED EMBODIMENTS

Referring now to the drawings, FIGS. 1 and 2 illustrate an embodiment of a false ceiling constituted by a sheet 1, constituted by a fabric cloth or a sheet of plastics material which is stretched and fastened, along its edges, to a support 2 fixed to the upper part of a wall 3. The support 2 is constituted by a horizontal longitudinal element extending all around the room and which is formed by sections of butt-jointed profiles. Each profile has a substantially L-shaped cross section and it presents, on its horizontal arm, a shoulder 4 on which is fastened an edge 5 of the sheet 1, in the form of a hook or harpoon.

According to the invention the stretched sheet 1 presents wherever there are vertical pipes 6 located at a certain distance from the wall, a reinforcing plate 7 which is glued on the upper face of the sheet 1. This reinforcing plate which may, for example, be a plate of translucent polyvinyl chloride, 2mm thick, is previously cut out so as to follow the shape of the or each pipe 6 which must pass through the sheet . In the example illustrated in FIG. 1, the reinforcing plate 7 which is generally rectangular in form, presents two parallel U-shaped cut-outs 8 both of which open out in the same longitudinal side of the plate 7. The two vertical pipes 6 are engaged in these two cut-outs 8. The reinforcing plate 7 thus maintains the sheet 1 perfectly in its zone close to the vertical pipes 6. Of course, those parts of the edge 5 in the form of a harpoon located beneath the inlet orifices of the cut-outs 8 are eliminated, and similarly, those parts of the sheet 1 which correspond to the rest of the surface of the cut-outs 8 are also removed so as to allow the reinforcing plate 7 to be freely engaged and glued to the sub-jacent sheet 1, between the two pipes 6 and on either side thereof.

FIG. 3 illustrates the use of a reinforcing plate 7 located in a corner of the room where the false ceiling is mounted and where there are two vertical pipes 6. There again, the reinforcing plate 7 is cut out so as to present, opposite the two pipes 6, the two U-shaped cut-outs 8.

In the embodiment of the invention shown in FIG. 4, the stretched sheet 1 bears a reinforcing plate 9 of rectangular form, which is pierced with a hole 10 tranversed by a vertical pipe 6, this hole 10 communicating with the edge 9a of the plate 9 which is located on the longitudinal element 2 side, via a slit 11 with contiguous lips. Of course, the subjacent sheet 1 is also split below the slit 11, in order to allow the sheet 1 and the reinforcing plate 9 glued thereto to be engaged around pipe 6, by opening the slit 11 and the corresponding slit of sheet 1 to a maximum, for this introduction.

I claim:

1. A false ceiling or false wall assembly for a room, comprising:
    a frame adapted to be secured to said ceiling or wall, said frame extending all around said room, said frame comprising a horizontal member having a horizontal terminal shoulder;
    a sheet having edges secured to said frame, said edges having along at least part of their length hook-shaped terminal portions secured to said shoulder to stretch said sheet in said frame;
    at least one opening in said sheet extending toward said frame to allow passage therein of a duct; and
    a reinforcing plate fixed on the top of said sheet;
    said plate having an opening superimposed on said sheet opening in registry therewith and having at least a terminal portion thereof on said sheet over said shoulder of said frame.

2. The assembly of claim 1, wherein said hook-shaped portions are interrupted in a part of said sheet lying under said opening.

3. The assembly of claim 1, wherein said frame is rectangular in shape and said openings in said plate and said sheet have a generally U-shaped form opening toward said frame.

4. The assembly of claim 1, wherein said sheet consists of fabric cloth.

5. The assembly of claim 1, wherein said sheet consist of plastic.

6. The assembly of claim 1, wherein said reinforcing plate consists of plastic.

7. The assembly of claim 6, wherein said plastic is polyvinyl chloride.

8. The assembly of claim 7, wherein said plate is about 2 mm thick.

9. The assembly of claim 1, wherein said plate is rectangular and has a circular opening terminating in a slit which opens toward said frame, said opening being defined by contiguous lips adapted to close said opening about said duct.

10. The assembly of claim 1, wherein said reinforcing plate is glued on the upper surface of said sheet.

11. The assembly of claim 1, wherein said hook-shaped portions located under the opening in said reinforcing plate are eliminated to permit the reinforcing plate to engage a pipe passing through said last-mentioned opening.

12. The assembly of claim 1, wherein said reinforcing plate has a slit extending from one side thereof and terminating at the opening in said reinforcing plate, said slit having contiguous lips which are openable to permit introduction of a pipe.

* * * * *